United States Patent
Odate et al.

(10) Patent No.: US 9,630,603 B2
(45) Date of Patent: Apr. 25, 2017

(54) BRAKING DEVICE FOR VEHICLE

(71) Applicant: HONDA MOTOR CO., LTD., Tokyo (JP)

(72) Inventors: Shotaro Odate, Wako (JP); Yosuke Mizutani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/093,982

(22) Filed: Apr. 8, 2016

(65) Prior Publication Data

US 2016/0311418 A1    Oct. 27, 2016

(30) Foreign Application Priority Data

Apr. 27, 2015 (JP) ................. 2015-090660

(51) Int. Cl.
| | |
|---|---|
| *B60T 8/00* | (2006.01) |
| *B60T 8/94* | (2006.01) |
| *B60T 8/171* | (2006.01) |
| *B60T 7/22* | (2006.01) |
| *B60T 8/88* | (2006.01) |
| B60T 8/48 | (2006.01) |

(52) U.S. Cl.
CPC .......... *B60T 8/94* (2013.01); *B60T 7/22* (2013.01); *B60T 8/171* (2013.01); *B60T 8/885* (2013.01); *B60T 8/4872* (2013.01); *B60T 2201/024* (2013.01); *B60T 2270/408* (2013.01)

(58) Field of Classification Search
None
See application file for complete search history.

(56) References Cited

U.S. PATENT DOCUMENTS

| | | | | |
|---|---|---|---|---|
| 2005/0200199 A1* | 9/2005 | Kamiya | ............... | B60T 7/065 303/191 |
| 2011/0266106 A1* | 11/2011 | Suzuki | ............... | B60T 7/042 188/360 |
| 2014/0339889 A1* | 11/2014 | Mizoguchi | ............... | B60T 7/22 303/9.62 |
| 2015/0112566 A1* | 4/2015 | Takagi | ............... | B60T 7/22 701/70 |
| 2016/0207532 A1* | 7/2016 | Kida | ............... | B60W 10/04 |

(Continued)

FOREIGN PATENT DOCUMENTS

JP       2012-001091 A      1/2012

*Primary Examiner* — Jonathan M Dager
(74) *Attorney, Agent, or Firm* — Chip Law Group (57) ABSTRACT

A braking device for vehicle includes: a master cylinder that generates an oil pressure in accordance with the amount of operation of a brake pedal; a vehicle stabilizing device that generates an oil pressure in accordance with an oil pressure generation command from a brake control device; and a braking unit that generates braking force in a vehicle in accordance with the oil pressure generated in the master cylinder or the vehicle stabilizing device. The brake control device puts automatic braking into operation by generating the oil pressure in the vehicle stabilizing device when an impact is detected by a collision detection sensor, and in a case where an abnormality of the vehicle has been detected during operation of the automatic braking, the brake control device controls the vehicle stabilizing device to stop operation of the automatic braking in accordance with influence on operation of the automatic braking.

4 Claims, 5 Drawing Sheets

(56) References Cited

U.S. PATENT DOCUMENTS

2016/0214604 A1* 7/2016 Kida .................. B60W 50/10
2016/0311413 A1* 10/2016 Odate ................... B60T 7/22
2017/0015314 A1* 1/2017 Tanase ................ B60W 30/09

* cited by examiner

BRAKING DEVICE FOR VEHICLE

CROSS REFERENCES TO RELATED APPLICATIONS

The present application claims priority under 35 U.S.C. §119 to Japanese Patent Application No. 2015-090660, filed Apr. 27, 2015, entitled "Braking Device for Vehicle." The contents of this application are incorporated herein by reference in their entirety.

BACKGROUND

1. Field

The present disclosure relates to a braking device for vehicle.

2. Description of the Related Art

Japanese Unexamined Patent Application Publication No. 2012-001091 describes a braking control device for vehicle (a braking device for vehicle). This braking control device automatically puts a brake control device into operation (puts automatic braking into operation) on the basis of a vehicle speed detected by a vehicle speed sensor in a case where collision of a host vehicle is detected by a collision detection sensor. The host vehicle is automatically braked after collision by such a braking control device.

The braking control device described in Japanese Unexamined Patent Application Publication No. 2012-001091, which puts the brake control device into operation (puts automatic braking into operation) upon detection of collision of a host vehicle, is unable to cope with an abnormality that occurs in the host vehicle after the brake control device is put into operation.

For example, even in a case where an abnormality occurs in the vehicle speed sensor or the like, the brake control device is put into operation on the basis of the vehicle speed, and therefore there is a possibility that behavior of the host vehicle becomes unstable.

In view of this, the purpose of the present disclosure is to provide a braking device for vehicle that stops operation of automatic braking upon occurrence of an abnormality in a vehicle during operation of the automatic braking in accordance with the influence of the abnormality on operation of the automatic braking.

SUMMARY

The present application describes a braking device for vehicle including: a first oil pressure generating unit that generates an oil pressure in an operating oil in accordance with an amount of operation of a brake operating unit; a second oil pressure generating unit that generates the oil pressure in the operating oil in accordance with an oil pressure generation command supplied from a brake control device; and a braking unit that is put into operation by the oil pressure generated in the operating oil in the first oil pressure generating unit or the oil pressure generated in the operating oil in the second oil pressure generating unit so as to generate braking force for braking a wheel of a vehicle. The brake control device puts automatic braking into operation by controlling the second oil pressure generating unit to generate the oil pressure when an impact is detected by a predetermined sensor provided in the vehicle, and in a case where an abnormality of the vehicle has been detected during operation of the automatic braking, the brake control device controls the second oil pressure generating unit to stop operation of the automatic braking in accordance with influence of the abnormality on operation of the automatic braking.

According to the present disclosure, in a case where an abnormality of a vehicle has been detected by the brake control device during operation of automatic braking for automatically generating braking force in the vehicle, operation of the automatic braking is stopped in accordance with the influence of the abnormality on operation of the automatic braking.

For example, in a case where an oil pressure is not generated due to an abnormality that occurs during operation of automatic braking in the second oil pressure generating unit that generates an oil pressure, the brake control device can control the second oil pressure generating unit to stop operation of the automatic braking. This allows braking force according to the amount of driver's operation of the brake operating unit to be generated in the vehicle. In this way, in a case where an abnormality, such as a failure of the second oil pressure generating unit to generate an oil pressure, that markedly affects operation of the automatic braking has occurred, the braking device for vehicle promptly stops operation of the automatic braking so that driver's intention can be reflected in behavior of the vehicle.

The braking device for vehicle according to the present disclosure may be arranged such that in a case where the abnormality is an abnormality of a failure to acquire vehicle body speed of the vehicle, the brake control device stops operation of the automatic braking after elapse of a predetermined period from activation of the automatic braking.

In a case where the vehicle body speed of the vehicle cannot be acquired, the brake control device cannot determine whether the vehicle is running or being parked, and therefore a situation where the automatic braking is operating even in a case where the vehicle is parked can occur.

According to the present disclosure, in a case where the vehicle body speed cannot be acquired, operation of the automatic braking is stopped after elapse of a predetermined operation period, and it is therefore possible to avoid a situation where the automatic braking is operating even in a case where the vehicle is parked. Accordingly, in a case where the driver operates the brake operating unit, braking force according to the amount of driver's operation is generated, and thus the driver's intention can be reflected in behavior of the vehicle.

The braking device for vehicle according to the present disclosure may be arranged such that in a case where the abnormality is an abnormality of a failure to acquire at least one of (i) an amount of operation of an accelerator operating unit that is operated to accelerate the vehicle and (ii) the amount of operation of the brake operating unit, the brake control device gradually decreases the braking force that is generated in the braking unit due to operation of the automatic braking, and stops operation of the automatic braking at a point in time at which the braking force becomes zero.

In a case where the amount of operation of the accelerator operating unit and/or the amount of operation of the brake operating unit cannot be acquired, the brake control device cannot determine that the accelerator operating unit and/or the brake operating unit has been operated.

According to the present disclosure, in a case where the amount of operation of the accelerator operating unit and/or the amount of operation of the brake operating unit cannot be detected, operation of the automatic braking is stopped after the braking force gradually decreases to zero, and therefore a driver's operation of the accelerator operating unit or the brake operating unit can be reflected in behavior of the vehicle.

The braking device for vehicle according to the present disclosure may be arranged such that in a case where the abnormality is an abnormality of a failure of the second oil pressure generating unit to generate the oil pressure, the brake control device stops operation of the automatic braking at a time of detection of the abnormality.

According to the present disclosure, in a case where during operation of the automatic braking, an oil pressure is not generated in the second oil pressure generating unit that generates an oil pressure, operation of the automatic braking is promptly stopped, and therefore braking force according to the amount of driver's operation of the brake operating unit can be generated in the vehicle. Accordingly, the vehicle that is not braked by the automatic braking can be braked by the driver's operation of the brake operating unit, and thus the driver's intention can be reflected in behavior of the vehicle.

According to the present disclosure, it is possible to provide a braking device for vehicle that stops operation of automatic braking upon occurrence of an abnormality in a vehicle during operation of the automatic braking in accordance with the influence of the abnormality on operation of the automatic braking.

DESCRIPTION OF THE PREFERRED EMBODIMENTS

An embodiment of the present disclosure is described in detail below with reference to the drawings as appropriate.

Figure 1:
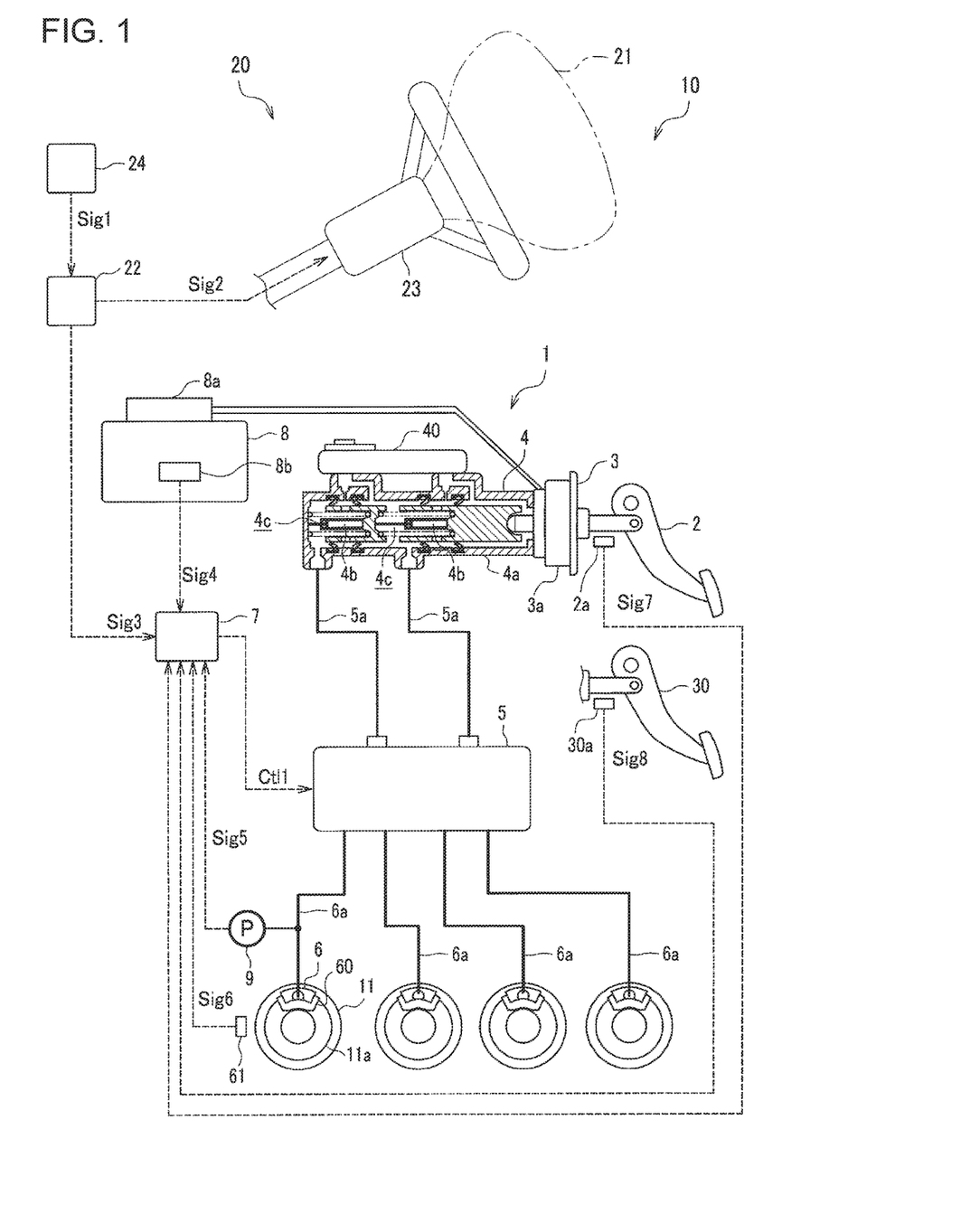
FIG. 1 is a diagram illustrating a vehicle including a braking device for vehicle according to the present embodiment.

FIG. 1 is a diagram illustrating a vehicle including a braking device for vehicle according to the present embodiment.

A vehicle 10 includes a braking device for vehicle 1. The braking device for vehicle 1 is a well-known general structure (an oil hydraulic brake), and this structure is briefly described below.

As illustrated in FIG. 1, the braking device for vehicle 1 according to the present embodiment includes a brake pedal 2, a brake booster 3, a master cylinder 4, a vehicle stabilizing device 5, braking units 6, and a brake control device 7.

The brake pedal 2 is a brake operating unit that is operated (pressed) by a driver.

The brake booster 3 is a booster that assists the driver's operation of pressing the brake pedal 2 by strengthening force of the driver's operation of pressing the brake pedal 2 (pressing force). The brake booster 3 has a booster main body 3a that is connected to a negative-pressure generator. In the present embodiment, the booster main body 3a is connected to an induction pipe 8a of an internal-combustion engine (engine 8). In the present embodiment, the induction pipe 8a of the engine 8 is the negative-pressure generator. The brake booster 3 strengthens the force of the operation of pressing the brake pedal 2 by using a negative pressure generated by the engine 8 (the induction pipe 8a) and supplied to an inside of the booster main body 3a. Note that the brake booster 3 having the booster main body 3a that is connected to a vacuum pump (negative-pressure pump) (not illustrated) may be used as the negative-pressure generator.

The master cylinder 4 is a first oil pressure generating unit that generates an oil pressure in an operating oil in accordance with the driver's operation of pressing the brake pedal 2. The master cylinder 4 has a cylindrical main body 4a in which pistons 4b are contained. The pistons 4b generate an oil pressure by sliding in the main body 4a and thereby compressing the operating oil in the main body 4a.

The master cylinder 4 generates an oil pressure in the operating oil in accordance with the amount of operation of pressing the brake pedal 2 (brake stroke).

The pistons 4b work by the force of the pressing operation strengthened by the brake booster 3.

When the driver presses the brake pedal 2, the pressing force is strengthened by the brake booster 3, the pistons 4b of the master cylinder 4 work by the strengthened pressing force, and thereby an oil pressure is generated in the operating fluid.

In the master cylinder 4, two pistons 4b are disposed in series. The inside of the main body 4a is divided into two oil pressure chambers 4c by the two pistons 4b, and an oil pressure is generated in each of the two oil pressure chambers 4c.

An oil pressure that is generated in the two oil pressure chambers 4c is supplied to the vehicle stabilizing device 5 via two pipes 5a that are connected to the respective oil pressure chambers 4c.

Furthermore, the master cylinder 4 includes a reservoir tank 40. The reservoir tank 40 stores the operating oil therein. The inside of the reservoir tank 40 communicates with the two oil pressure chambers 4c provided in the master cylinder 4.

The vehicle stabilizing device 5 supplies the oil pressure delivered via the pipes 5a to the braking units 6 via pipes 6a. Furthermore, the vehicle stabilizing device 5 functions as a second oil pressure generating unit that generates an oil pressure to be supplied to the braking units 6 in accordance with a command (oil pressure generation command Ctl1) supplied from the brake control device 7. In the present embodiment, the brake control device 7 is a control unit that controls the vehicle stabilizing device 5 (the second oil pressure generating unit) to generate an oil pressure in the operating oil.

Details of the vehicle stabilizing device 5 will be described later.

The braking units 6 generate braking force for braking wheels 11. The braking force generated by the braking units 6 is braking force applied to the vehicle 10. The braking units 6 work by the oil pressure. The braking units 6 are, for example, calipers 60 that generate braking force, and the calipers 60 and the wheels 11 sandwich discs 11a that rotate, respectively.

The pipes 6a that supply the oil pressure to the braking units 6 include an oil pressure gauge 9. The oil pressure gauge 9 measures the oil pressure in the pipes 6a and supplies the measurement signal (oil pressure signal Sig5) to the brake control device 7. The brake control device 7 acquires the oil pressure in the pipes 6a on the basis of the oil pressure signal Sig5. In the present embodiment, the oil pressure in the pipes 6a is a caliper pressure that drives the calipers 60. That is, the brake control device 7 acquires the caliper pressure on the basis of the oil pressure signal Sig5.

Note that although a single oil pressure gauge 9 is illustrated in FIG. 1, it is also possible to employ a configuration in which each of the four pipes 6a that supply oil pressures to the four respective wheels 11 includes the oil pressure gauge 9. In this case, the brake control device 7 acquires the caliper pressure on the basis of oil pressure signals Sig5 supplied from the four respective oil pressure gauges 9.

For example, the brake control device 7 uses, as the caliper pressure, an average of the oil pressures in the four pipes 6a calculated from the four respective oil pressure signals Sig5.

The wheels 11 include a rotation speed sensor 61. The rotation speed sensor 61 of the present embodiment converts the number of rotations of the wheels 11 per predetermined period into a pulse wave signal (vehicle speed signal Sig6) and then supplies the pulse wave signal (vehicle speed signal Sig6) to the brake control device 7. The brake control device 7 calculates rotation speed of the wheels 11 on the basis of the vehicle speed signal Sig6 and calculates vehicle speed (vehicle body speed) of the vehicle 10 on the basis of the rotation speed of the wheels 11. By thus calculating the vehicle body speed of the vehicle 10 from the rotation speed of the wheels 11, the brake control device 7 of the present embodiment acquires the vehicle body speed of the vehicle 10.

Note that although a single rotation speed sensor 61 is illustrated in FIG. 1, it is also possible to employ a configuration in which each of the four wheels 11 includes the rotation speed sensor 61. In this case, the brake control device 7 acquires (calculates) the vehicle body speed on the basis of vehicle speed signals Sig6 supplied from the four respective rotation speed sensors 61.

An engine control device 8b that controls the engine 8 detects rotation speed of the engine 8 and supplies the detection signal (rotation speed signal Sig4) to the brake control device 7. The brake control device 7 acquires the rotation speed of the engine 8 on the basis of the rotation speed signal Sig4.

The brake pedal 2 includes a brake stroke sensor 2a. The brake stroke sensor 2a measures a stroke amount in the operation of pressing the brake pedal 2 and outputs a brake stroke signal Sig7. The brake stroke signal Sig7 is supplied to the brake control device 7. The brake control device 7 acquires brake stroke by calculating the amount of operation of pressing the brake pedal 2 (brake stroke) on the basis of the brake stroke signal Sig7.

Furthermore, an accelerator stroke signal Sig8 is supplied to the brake control device 7. The accelerator stroke signal Sig8 is supplied from an accelerator stroke sensor 30a. The accelerator stroke sensor 30a measures a stroke amount in an operation of pressing an accelerator pedal 30 and outputs the accelerator stroke signal Sig8. The brake control device 7 acquires accelerator stroke by calculating the amount of operation of pressing the accelerator pedal 30 (accelerator stroke) on the basis of the accelerator stroke signal Sig8.

The accelerator pedal 30 accelerates the vehicle 10 by increasing the rotation speed of the engine 8 when the accelerator pedal 30 is operated by a driver. That is, the accelerator pedal 30 is an accelerator operating unit that is operated to accelerate the vehicle 10.

Furthermore, the vehicle 10 includes an air-bag device 20. The air-bag device 20 includes an air bag 21 and an air-bag control device 22. The air bag 21 is contained in a steering wheel 23 in a folded state and expands when an inflator (not illustrated) works on the basis of a signal (air-bag operation signal Sig2) supplied from the air-bag control device 22.

The air-bag control device 22 activates the air-bag device 20 on the basis of a signal (impact detection signal Sig1) supplied from a collision detection sensor 24 provided in the vehicle 10. Specifically, the air-bag control device 22 expands the air bag 21 by supplying the air-bag operation signal Sig2 to the inflator upon receipt of the impact detection signal Sig1 supplied from the collision detection sensor 24. The collision detection sensor 24 supplies the impact detection signal Sig1 to the air-bag control device 22 when the vehicle 10 receives an impact that is larger than a predetermined threshold value. That is, in the present embodiment, the collision detection sensor 24 is a sensor that detects an impact received by the vehicle 10.

Note that it is also possible to employ a configuration in which the collision detection sensor 24 outputs an impact detection signal Sig1 that varies depending on the magnitude of the impact received by the vehicle 10. In this case, the air-bag control device 22 expands the air bag 21 by outputting the air-bag operation signal Sig2 in a case where the magnitude of an impact calculated from the impact detection signal Sig1 is larger than a predetermined threshold value.

When the air-bag control device 22 of the present embodiment activates the air-bag device 20, the air-bag control device 22 supplies a predetermined signal (air-bag activation signal Sig3) to the brake control device 7. The brake control device 7 detects activation of the air-bag device 20 on the basis of the air-bag activation signal Sig3.

Figure 2:
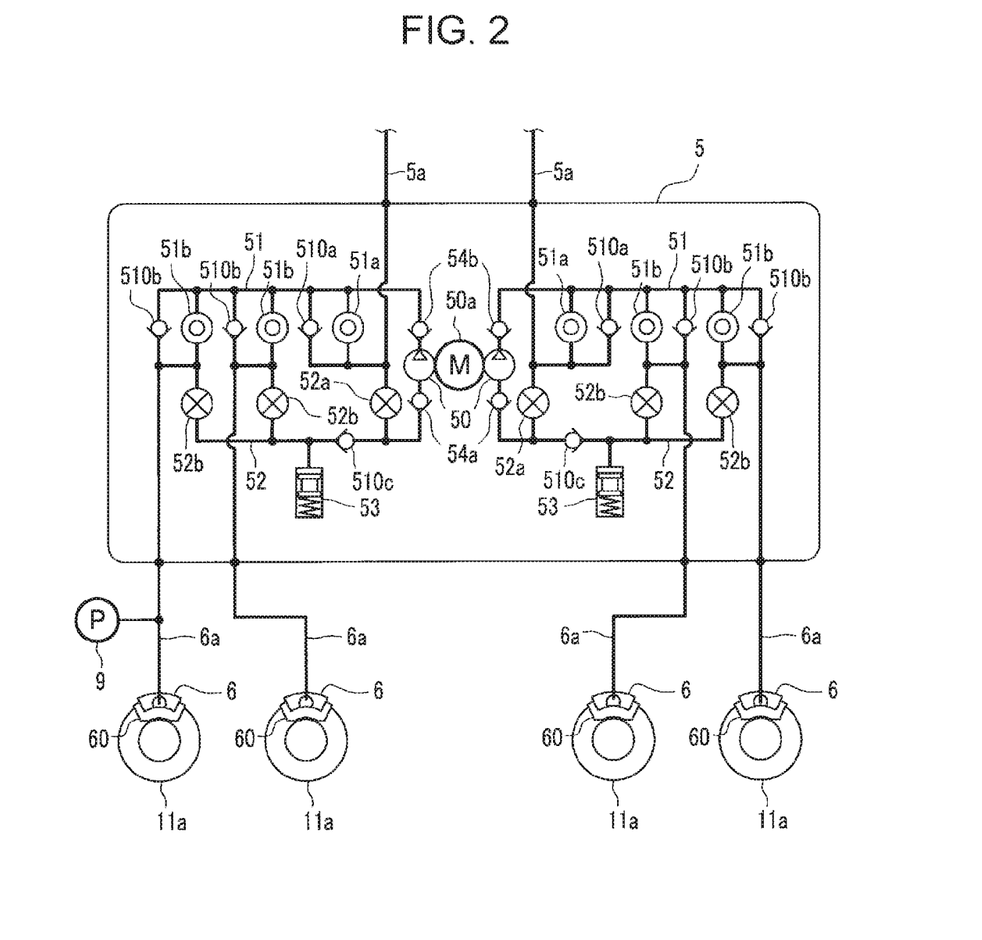
FIG. 2 is a diagram illustrating a configuration of a vehicle stabilizing device.
Figure 3:
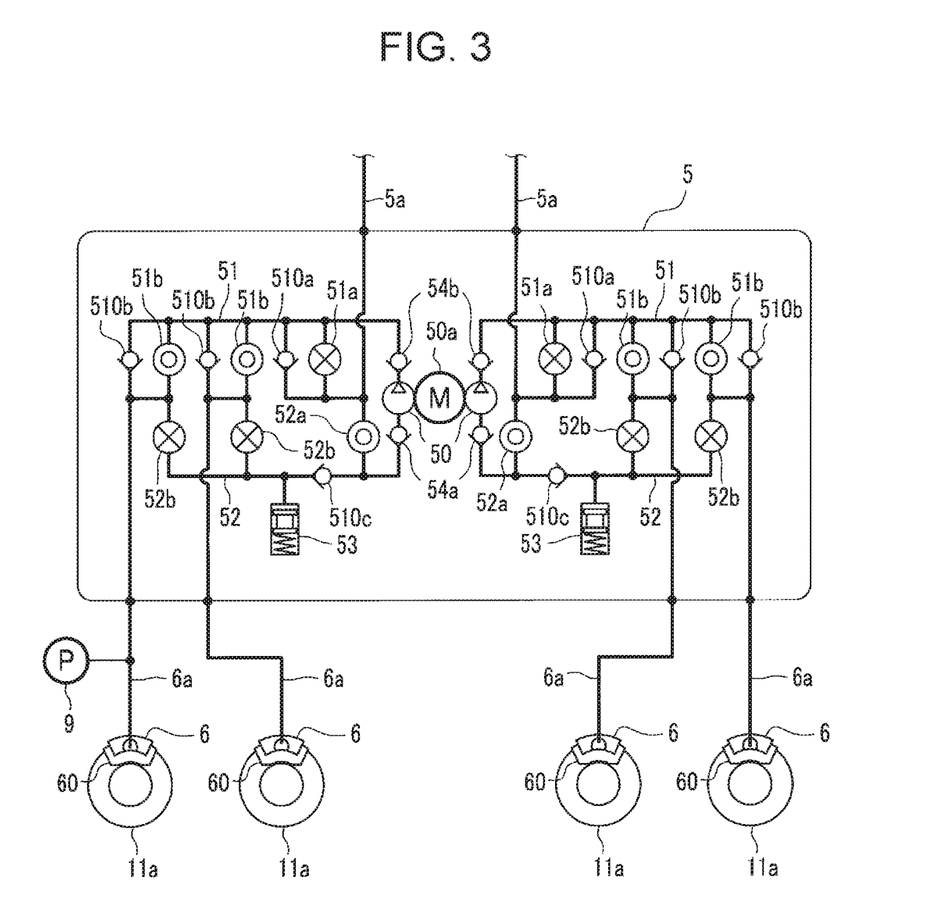
FIG. 3 is a diagram illustrating the vehicle stabilizing device during operation of the automatic braking.

FIG. 2 is a diagram illustrating a configuration of a vehicle stabilizing device. FIG. 3 is a diagram illustrating the vehicle stabilizing device during operation of automatic braking. In FIGS. 2 and 3, the white circles represent opened valves, and the x marks represent closed valves.

The vehicle stabilizing device 5 adjusts an oil pressure generated in the master cylinder 4 (see FIG. 1) in accordance with the command (the oil pressure generation command Ctl1) supplied from the brake control device 7 (see FIG. 1) and then supplies the oil pressure to the braking unit 6.

As illustrated in FIG. 2, the vehicle stabilizing device 5 is constituted by two systems (oil pressure systems) corresponding to the two oil pressure chambers 4c (see FIG. 1) provided in the master cylinder 4. The two oil pressure systems are equivalent to each other. Each of the oil pressure systems in the vehicle stabilizing device 5 supplies an oil pressure to the braking units 6 of two wheels 11 (see FIG. 1).

In the vehicle stabilizing device 5, first common liquid pressure passages 51 and second common liquid pressure passages 52 are disposed. The first common liquid pressure passages 51 supply an oil pressure to the braking unit 6. The pipes 5a are connected to the first common liquid pressure passages 51 via regulator valves 51a.

First check valves 510a are provided in parallel with the regulator valves 51a. The first check valves 510a are one-way valves that allow an operating fluid to flow in one direction from the pipes 5a toward the first common liquid pressure passages 51.

The first common liquid pressure passages 51 are connected to the pipes 6a via in-valves 51b. The in-valves 51b are solenoid valves. Furthermore, second check valves 510b are provided in parallel with the in-valves 51b. The second check valves 510b are one-way valves that allow an operating fluid to flow in one direction from the pipes 6a toward the first common liquid pressure passages 51.

Note that the regulator valves 51a and the in-valves 51b are normally open type solenoid valves that are opened in a non-conductive state.

The regulator valves 51a and the first check valves 510a are connected to the second common liquid pressure passages 52 via suction valves 52a. The in-valves 51b and the second check valves 510b are connected to the second common liquid pressure passages 52 via out-valves 52b.

The suction valves 52a and the out-valves 52b are normally close type solenoid valves that are closed in a non-conductive state.

The second common liquid pressure passages 52 include respective reservoir devices 53. The reservoir devices 53 temporarily store an operating oil therein.

The second common liquid pressure passages 52 include respective third check valves 510c between the respective reservoir devices 53 and the respective suction valves 52a. The third check valves 510c are one-way valves that allow an operating fluid to flow in one direction from the reservoir devices 53 toward the suction valves 52a.

The vehicle stabilizing device 5 includes pumps 50 that delivers an operating oil from the second common liquid pressure passages 52 to the first common liquid pressure passages 51 and a motor 50a that drives the pumps 50. Furthermore, the vehicle stabilizing device 5 includes inlet valves 54a, which are provided in the respective second common liquid pressure passages 52 on an inlet-side of the pumps 50, and outlet valves 54b, which are provided in the respective first common liquid pressure passages 51 on an outlet side of the pumps 50.

The regulator valves 51a, the in-valves 51b, the suction valves 52a, the out-valves 52b, and the motor 50a that are provided in the vehicle stabilizing device 5 are controlled by the brake control device 7 (see FIG. 1).

In a normal state, the brake control device 7 (see FIG. 1) controls the vehicle stabilizing device 5 to open the regulator valves 51a and the in-valves 51b and close the suction valves 52a and the out-valves 52b.

An oil pressure generated in the master cylinder 4 (see FIG. 1) is supplied to the vehicle stabilizing device 5 via the pipes 5a and is then supplied to the first common liquid pressure passages 51 via the regulator valves 51a. The oil pressure supplied to the first common liquid pressure passages 51 is supplied to the pipes 6a via the in-valves 51b and is then supplied to the braking units 6.

Upon receipt of the air-bag activation signal Sig3 from the air-bag control device 22 (see FIG. 1), the brake control device 7 (see FIG. 1) controls the vehicle stabilizing device 5 to put automatic braking into operation. Upon receipt of the air-bag activation signal Sig3, the brake control device 7 controls the vehicle stabilizing device 5 to open the suction valves 52a and close the regulator valves 51a. Furthermore, the brake control device 7 controls the vehicle stabilizing device 5 to close the out-valves 52b.

As illustrated in FIG. 3, the vehicle stabilizing device 5 is brought into a state where the regulator valves 51a and the out-valves 52b are closed and the suction valves 52a and the in-valves 51b are opened. Then, the brake control device 7 drives the electric motor 50a.

When the motor 50a is driven, the operating oil in the second common liquid pressure passages 52 is pressurized by the pump 50, and thus an oil pressure is generated. The oil pressure is supplied to the braking units 6 via the first common liquid pressure passages 51, the in-valves 51b, and the pipes 6a. The braking units 6 are put into operation by the supplied oil pressure and thus generate braking force.

Since the suction valves 52a are opened, an operating oil is also supplied to the pumps 50 from the oil pressure chambers 4c (see FIG. 1) of the master cylinder 4 and the reservoir tank 40 (see FIG. 1).

In this case, the brake control device 7 (see FIG. 1) acquires a caliper pressure (oil pressure in the pipe 6a) on the basis of the oil pressure signal Sig5 supplied from the oil pressure gauge 9 and drives the pumps 50 so that the caliper pressure becomes a predetermined pressure.

For example, a standard caliper pressure (hereinafter referred to as a standard oil pressure) during operation of the automatic braking is preset on the basis of the driving performance and the like of the vehicle 10 (see FIG. 1). During operation of the automatic braking, the brake control device 7 (see FIG. 1) drives the pumps 50 so that the caliper pressure (oil pressure in the pipe 6a) is kept at the standard oil pressure on the basis of the oil pressure signal Sig5 supplied from the oil pressure gauge 9.

The standard oil pressure is, for example, set as appropriate as a design value in accordance with the driving performance and the like of the vehicle 10.

In this way, the brake control device 7 illustrated in FIG. 1 puts the automatic braking into operation upon receipt of the air-bag activation signal Sig3 supplied from the air-bag control device 22.

As described above, the air-bag control device 22 puts the air-bag device 20 into operation upon receipt of the impact detection signal Sig1 from the collision detection sensor 24. The collision detection sensor 24 supplies the impact detection signal Sig1 to the air-bag control device 22 upon detection of an impact received by the vehicle 10. The brake control device 7 puts the automatic braking into operation upon receipt of the air-bag activation signal Sig3 supplied from the air-bag control device 22 that has put the air-bag device 20 into operation. That is, upon detection of impact force by the collision detection sensor 24 of the vehicle 10, the brake control device 7 of the present embodiment puts the automatic braking into operation by supplying the command (the oil pressure generation command Ctl1) to the vehicle stabilizing device 5 and thus generating an oil pressure.

The brake control device 7 of the present embodiment illustrated in FIG. 1 is configured to stop, upon detection of an abnormality of the vehicle 10 during operation of the automatic braking, operation of the automatic braking under control according to the rank of the abnormality (the magnitude of influence on operation of the automatic braking).

The brake control device 7 of the present embodiment classifies abnormalities that are determined to have occurred in the vehicle 10 into three stages: S rank, A rank, and B rank. An abnormality of the S-rank (S-rank abnormality) is an abnormality whose influence on operation of the automatic braking in the vehicle 10 is large. An abnormality of the A-rank (A-rank abnormality) is an abnormality whose influence on operation of the automatic braking is smaller than that of the S-rank abnormality, and an abnormality of the B-rank (B-rank abnormality) is an abnormality whose influence on operation of the automatic braking is smaller than that of the A-rank abnormality. Such abnormality ranks (the S rank, A rank, and B rank) are preset as design values.

In one example, the brake control device 7 of the present embodiment (see FIG. 1) classifies a state where an oil pressure is not generated in the vehicle stabilizing device 5 (see FIG. 2) into the S-rank abnormality. For example, in a case where the caliper pressure (oil pressure in the pipes 6a illustrated in FIG. 2) does not rise although the brake control device 7 puts the automatic braking into operation and outputs a command for driving the motor 50a (see FIG. 2), the brake control device 7 determines that an abnormality of a failure to generate an oil pressure in the vehicle stabilizing device 5 has occurred.

That is, the brake control device 7 determines that an abnormality of a failure to generate an oil pressure in the vehicle stabilizing device 5 has occurred and determines that an S-rank abnormality of the vehicle 10 has been detected in a case where the oil pressure in the pipes 6a that is calculated on the basis of the oil pressure signal Sig5 supplied from the oil pressure gauge 9 does not rise.

Such an abnormality of the vehicle stabilizing device 5 sometimes occurs, for example, due to malfunction of the motor 50a (see FIG. 2), malfunction of the pumps 50 (see FIG. 2), or the like.

The brake control device 7 of the present embodiment classifies a state where the vehicle body speed of the vehicle 10 cannot be acquired into the A-rank abnormality. As described above, the brake control device 7 acquires (calculates) the vehicle body speed on the basis of the vehicle speed signal Sig6 supplied from the rotation speed sensor 61. Therefore, in a case where it is determined that an abnormality has occurred in the rotation speed sensor 61, the brake control device 7 determines that an A-rank abnormality of the vehicle 10 has been detected.

For example, the brake control device 7 determines that an abnormality has occurred in the rotation speed sensor 61 and determines that an A-rank abnormality has occurred in a case where the vehicle speed signal Sig6 that should be a pulse wave signal becomes constant at a predetermined level, a case where the level (signal level) of the vehicle speed signal Sig6 becomes high above a normal range and is fixed (remains unchanged) at this state, a case where the signal level of the vehicle speed signal Sig6 becomes low below the normal range, or the like.

Such an abnormality of the rotation speed sensor 61 sometimes occurs, for example, due to an abnormality of a power supply voltage supplied to the rotation speed sensor 61, an abnormality (e.g., disconnection) of a signal line connecting the rotation speed sensor 61 and the brake control device 7, or the like.

The brake control device 7 of the present embodiment classifies a state where brake stroke and/or accelerator stroke cannot be acquired into the B-rank abnormality. That is, the brake control device 7 classifies a state where at least one of the amount of operation of the brake pedal 2 (see FIG. 1) and the amount of operation of the accelerator pedal 30 (see FIG. 1) cannot be acquired into the B-rank abnormality.

As described above, the brake control device 7 acquires (calculates) brake stroke on the basis of the brake stroke signal Sig7 supplied from the brake stroke sensor 2a. Furthermore, the brake control device 7 acquires (calculates) accelerator stroke on the basis of the accelerator stroke signal Sig8 supplied from the accelerator stroke sensor 30a. Therefore, the brake control device 7 determines that a B-rank abnormality of the vehicle 10 has been detected in a case where an abnormality has occurred in the brake stroke sensor 2a and/or the accelerator stroke sensor 30a.

For example, the brake control device 7 determines that an abnormality has occurred in the brake stroke sensor 2a and/or the accelerator stroke sensor 30a in a case where the signal level of the brake stroke signal Sig7 and/or the accelerator stroke signal Sig8 is fixed (remains unchanged) at a high level above a normal range, a case where the signal level of the brake stroke signal Sig7 and/or the accelerator stroke signal Sig8 becomes low below the normal range, or the like.

Such an abnormality sometimes occurs, for example, due to an abnormality of a power supply voltage supplied to the brake stroke sensor 2a and/or the accelerator stroke sensor 30a, an abnormality (e.g., disconnection) of a signal line connecting the brake stroke sensor 2a and the brake control device 7 and/or a signal line connecting the accelerator stroke sensor 30a and the brake control device 7, or the like.

In a case where an S-rank abnormality of the vehicle 10 is detected during operation of the automatic braking, the brake control device 7 stops operation of the automatic braking by controlling the vehicle stabilizing device 5 at the time of detection of the S-rank abnormality. Specifically, the brake control device 7 stops the pumps 50 (motor 50a) of the vehicle stabilizing device 5 illustrated in FIG. 2 and closes the suction valves 52a.

This allows an oil pressure generated in the master cylinder 4 by an operation of pressing the brake pedal 2 to be supplied to the braking units 6. Therefore, in a case where an abnormality has occurred in the vehicle stabilizing device 5 during operation of the automatic braking, braking force can be generated in the vehicle 10 by a driver's operation of pressing the brake pedal 2.

Furthermore, in a case where an A-rank abnormality of the vehicle 10 has been detected during operation of the automatic braking, the brake control device 7 stops operation of the automatic braking after elapse of a predetermined period (minimum operation period) from activation of the automatic braking.

Therefore, in a case where the brake control device 7 becomes unable to acquire (calculate) the vehicle body speed of the vehicle 10 during operation of the automatic braking, operation of the automatic braking is stopped after elapse of the minimum operation period irrespective of the vehicle body speed. This avoids a situation where the automatic braking is operating on the vehicle 10 that is parked. For example, in a case where the driver presses the accelerator pedal 30 (see FIG. 1) with the intention of accelerating the vehicle 10, the driver's intention is effectively reflected in the behavior of the vehicle 10, and the vehicle 10 is promptly accelerated.

In a case where a B-rank abnormality of the vehicle 10 has been detected during operation of the automatic braking, the brake control device 7 controls the vehicle stabilizing device 5 to gradually decrease the oil pressure generated in the vehicle stabilizing device 5, thereby gradually decreasing the caliper pressure and gradually decreasing the braking force generated in the vehicle 10. For example, the brake control device 7 decreases the caliper pressure at a constant rate at predetermined time intervals. Then, the brake control device 7 stops operation of the automatic braking at a point in time at which the caliper pressure becomes zero, i.e., at a point in time at which the braking force generated in the vehicle 10 becomes zero.

Therefore, in a case where the brake control device 7 is unable to acquire brake stroke and/or accelerator stroke during operation of the automatic braking, braking force is gradually decreased in accordance with a gradual decrease in the caliper pressure, and operation of the automatic braking is stopped at a point in time at which the caliper pressure (braking force) becomes zero.

For example, in a case where the driver presses the accelerator pedal 30 with the intention of accelerating the vehicle 10 (accelerating intention) during operation of the automatic braking, the vehicle 10 is accelerated in accordance with the driver's accelerating intention when the caliper pressure (braking force) becomes zero and operation of the automatic braking is stopped after elapse of a certain period. In this way, the driver's accelerating intention is effectively reflected in the behavior (acceleration) of the vehicle 10.

In a case where the driver presses the brake pedal 2 with the intention of decelerating the vehicle 10 (decelerating intention), the vehicle 10 is decelerated in accordance with the driver's decelerating intention when operation of the automatic braking is stopped after elapse of a certain period. In this way, the driver's decelerating intention is effectively reflected in the behavior (deceleration) of the vehicle 10.

Figure 4:
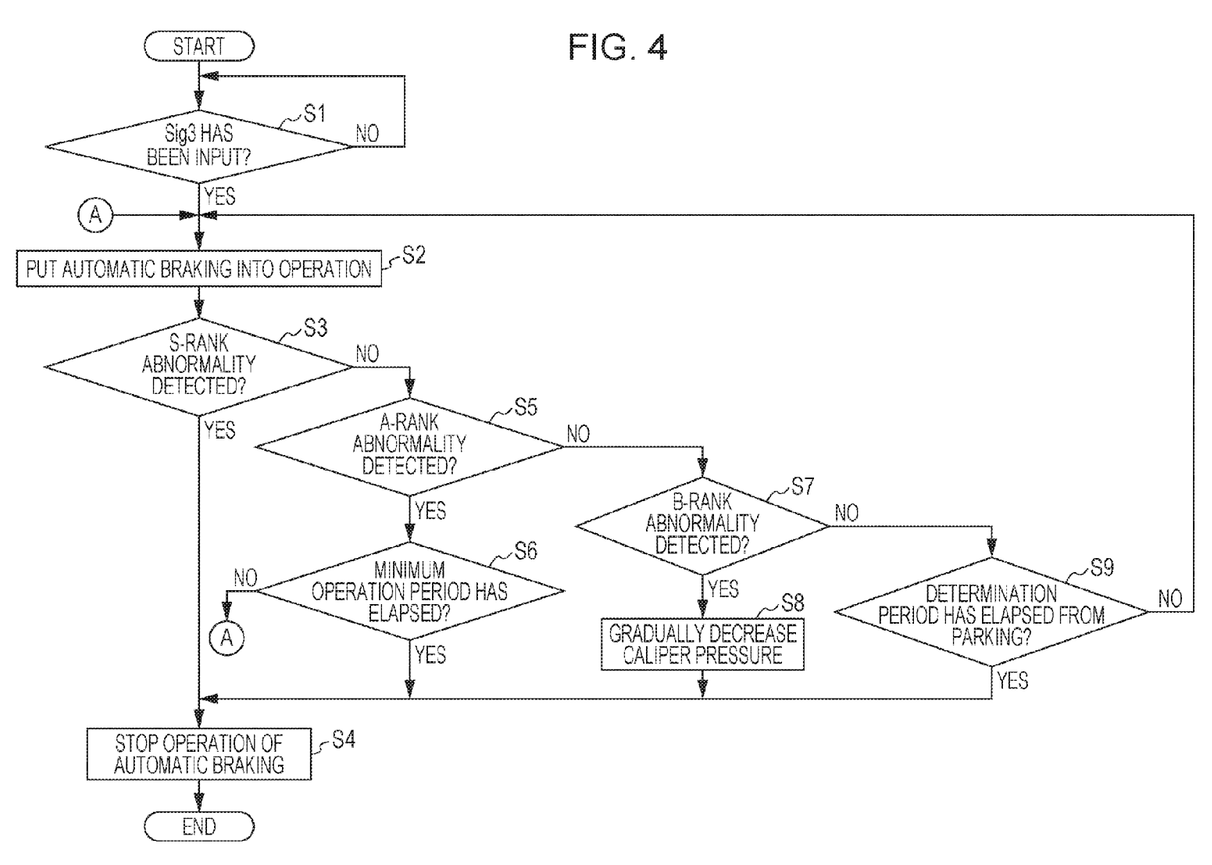
FIG. 4 is a flow chart illustrating a procedure in which a brake control device operates automatic braking.

FIG. 4 is a flow chart illustrating a procedure in which the brake control device puts the automatic braking into operation.

The procedure in which the brake control device 7 (see FIG. 1) puts the automatic braking into operation is described below with reference to FIG. 4 (see FIGS. 1 through 3 as appropriate).

The brake control device 7 waits until the air-bag activation signal Sig3 is supplied from the air-bag control device 22 (No in Step S1). In a case where the air-bag activation signal Sig3 is supplied (Yes in Step S1), the brake control device 7 controls the vehicle stabilizing device 5 to put the automatic braking into operation (Step S2).

As described above, the brake control device 7 opens the suction valves 52a of the vehicle stabilizing device 5 and closes the regulator valves 51a of the vehicle stabilizing device 5 and then drives the motor 50a. The pumps 50 are driven by the motor 50a.

In this case, the brake control device 7 drives the pumps 50 so that the caliper pressure (the oil pressure in the pipes 6a) is kept at a predetermined standard oil pressure. The brake control device 7 calculates the oil pressure in the pipes 6a on the basis of the oil pressure signal Sig5 supplied from the oil pressure gauge 9 and drives the pumps 50 so that the calculated oil pressure is kept at the standard oil pressure.

The brake control device 7 determines whether or not an S-rank abnormality of the vehicle 10 has been detected (Step S3). The brake control device 7 of the present embodiment determines whether or not an S-rank abnormality (abnormality of the vehicle stabilizing device 5) has been detected on the basis of a change in the caliper pressure.

That is, the brake control device 7 of the present embodiment determines that an S-rank abnormality of the vehicle 10 has been detected in a case where the caliper pressure does not change (rise) during operation of the automatic braking.

In a case where it is determined that an S-rank abnormality is detected (Yes in Step S3), the brake control device 7 stops operation of the automatic braking (Step S4).

When operation of the automatic braking is stopped (Step S4), the brake control device 7 stops the pumps 50 (motor 50a) of the vehicle stabilizing device 5 and closes the suction valves 52a.

In a case where it is determined that an S-rank abnormality of the vehicle 10 has not been detected (No in Step S3), the brake control device 7 determines whether or not an A-rank abnormality of the vehicle 10 has been detected (Step S5). As described above, the brake control device 7 determines whether or not an A-rank abnormality of the vehicle 10 (abnormality of the rotation speed sensor 61) has been detected on the basis of the state of the vehicle speed signal Sig6. That is, the brake control device 7 of the present embodiment determines that an A-rank abnormality has been detected in a case where it becomes impossible to acquire the vehicle body speed of the vehicle 10 on the basis of the vehicle speed signal Sig6.

In a case where it is determined that an A-rank abnormality of the vehicle 10 has been detected (Yes in Step S5), the brake control device 7 determines whether or not a minimum operation period has elapsed from activation of the automatic braking (Step S6). In a case where the minimum operation period has elapsed from activation of the automatic braking (Yes in Step S6), the brake control device 7 proceeds to Step S4 and stops operation of the automatic braking. Meanwhile, in a case where the minimum operation period has not elapsed from activation of the automatic braking (No in Step S6), the brake control device 7 returns to Step S2 through the junction A.

In a case where it is determined that an A-rank abnormality of the vehicle 10 has not been detected (No in Step S5), the brake control device 7 determines whether or not a B-rank abnormality of the vehicle 10 has been detected (Step S7). As described above, the brake control device 7 determines whether or not a B-rank abnormality (abnormality of the brake stroke sensor 2a and/or the accelerator stroke sensor 30a) has been detected on the basis of the state of the brake stroke signal Sig7 and/or the accelerator stroke signal Sig8.

That is, the brake control device 7 of the present embodiment determines that a B-rank abnormality has been detected in a case where the level (signal level) of the brake stroke signal Sig7 or the accelerator stroke signal Sig8 is abnormal or in a case where the brake control device 7 is unable to recognize at least one of the brake stroke signal Sig7 and the accelerator stroke signal Sig8.

In a case where it is determined that a B-rank abnormality of the vehicle 10 has been detected (Yes in Step S7), the brake control device 7 gradually decreases the caliper pressure (Step S8). Meanwhile, in a case where it is determined that a B-rank abnormality has not been detected (No in Step S7), the brake control device 7 proceeds to Step S9.

In a case where it is determined that the vehicle 10 has been parked and where a predetermined determination period has elapsed in the parked state (Yes in Step S9), the brake control device 7 stops operation of the automatic braking (Step S4). Note that the brake control device 7 returns to Step S2 and continues operation of the automatic braking until the predetermined determination period elapses from parking of the vehicle 10 (No in Step S9).

Note that it is also possible to employ a configuration in which the processing in Step S2 (operation of the automatic braking) and the processing in Steps S3 through S9 are performed simultaneously (in parallel) in time-division parallel processing.

Alternatively, it is also possible to employ a configuration in which the brake control device 7 has two or more CPUs (Central Processing Units) and the processing in Step S2 (operation of the automatic braking) and the processing in Steps S3 through S9 are performed by the different CPUs.

Figure 5:
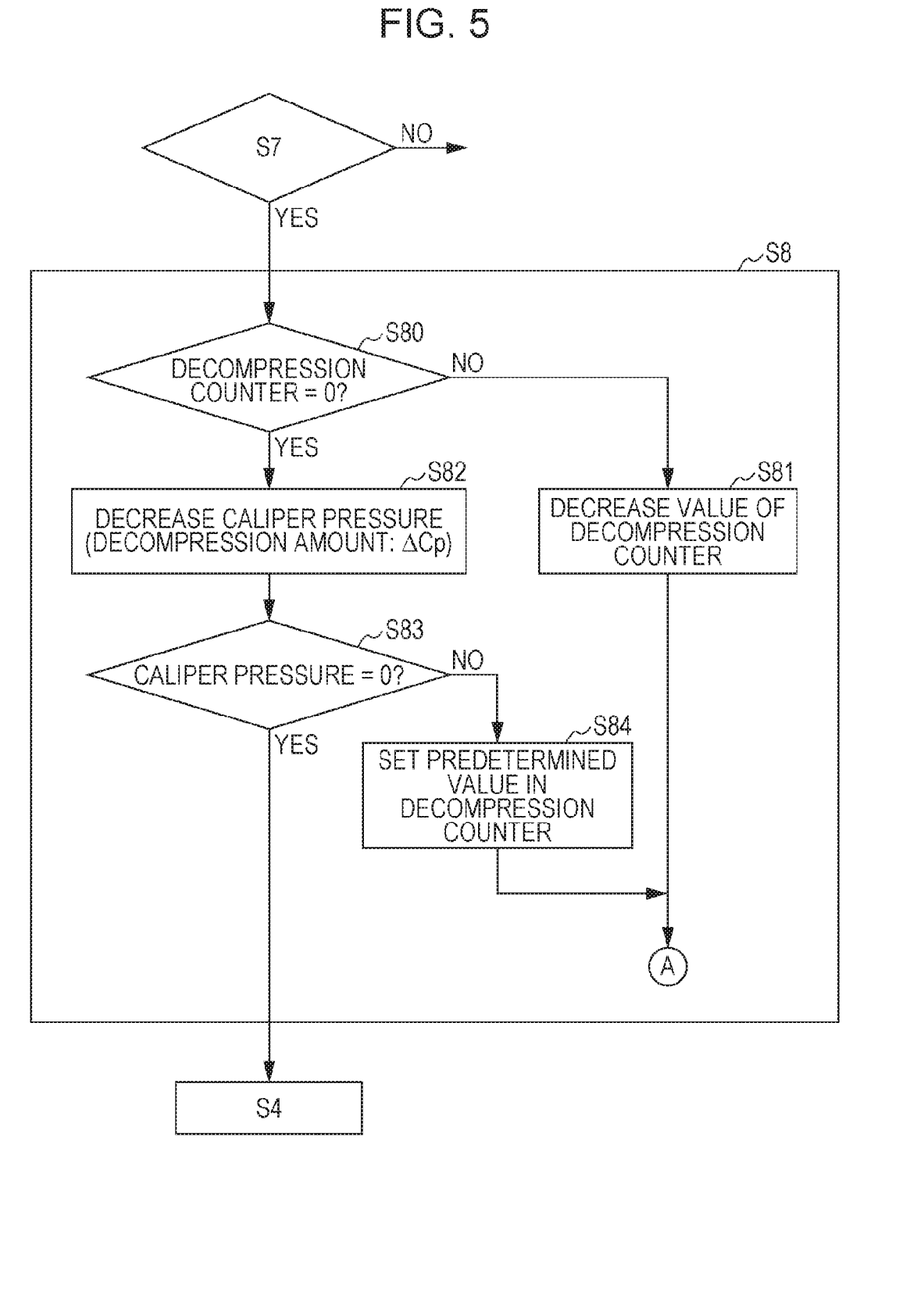
FIG. 5 is a flow chart illustrating a procedure in which the brake control device gradually decreases a caliper pressure.

FIG. 5 is a flow chart illustrating a procedure in which the brake control device gradually decreases a caliper pressure.

In a case where the brake control device 7 (see FIG. 1) gradually decreases the caliper pressure in Step S8 illustrated in FIG. 4, the caliper pressure is gradually decreased in accordance with the procedure in the flow chart illustrated in FIG. 5. The procedure in which the brake control device 7 gradually decreases the caliper pressure is described below with reference to FIG. 5 (see FIGS. 1 through 4 as appropriate).

In the procedure in which the brake control device 7 gradually decreases the caliper pressure, in a case where the value of a predetermined counter (decompression counter) is not zero (No in Step S80), the value of the decompression counter is decreased (Step S81), and then the procedure returns to Step S2 in FIG. 4 through the junction A.

Meanwhile, in a case where the value of the decompression counter is zero (Yes in Step S80), the brake control device 7 decreases the caliper pressure by a predetermined decompression amount $\Delta Cp$ (Step S82). The decompression amount $\Delta Cp$ may be any design value that is set as appropriate in accordance with braking performance and the like required of the vehicle 10. The decompression amount $\Delta Cp$ is, for example, set so that the deceleration of the vehicle 10 changes by 0.05 G.

Then, the brake control device 7 determines whether or not the caliper pressure is zero (Step S83). In a case where the caliper pressure is not zero (No in Step S83), the brake control device 7 sets a predetermined value in the decompression counter (Step S84), and returns to Step S2 in FIG. 4 through the junction A.

The decompression counter is a counter that sets the rate of the gradual decrease of the caliper pressure, and the caliper pressure is decreased more gradually as the predetermined value set in the decompression counter in Step S84 is larger.

The predetermined value set in the decompression counter may be any design value that is set as appropriate in accordance with braking performance and the like required of the vehicle 10.

In a case where the caliper pressure is zero (Yes in Step S83), the brake control device 7 proceeds to Step S4 illustrated in FIG. 4 and stops operation of the automatic braking.

In a case where it is determined that a B-rank abnormality of the vehicle 10 has been detected during operation of the automatic braking, the brake control device 7 gradually decreases the caliper pressure by performing the processing in Steps S80 through S84 illustrated in FIG. 5.

The braking force generated in the vehicle 10 (see FIG. 1) decreases (gradually decreases) in accordance with a decrease (gradual decrease) of the caliper pressure. Then, the brake control device 7 stops operation of the automatic braking at a point in time at which the caliper pressure (braking force) becomes zero.

As described above, the brake control device 7 of the present embodiment illustrated in FIG. 1 puts the automatic braking into operation upon receipt of the air-bag activation signal Sig3 from the air-bag control device 22.

Furthermore, in a case where an abnormality of the vehicle 10 has been detected during operation of the automatic braking, the brake control device 7 classifies the abnormality into S rank, A rank, or B rank. The abnormality detected by the brake control device 7 is classified into any of the ranks in accordance with the influence on operation of the automatic braking.

An S-rank abnormality is an abnormality whose influence on operation of the automatic braking is large. An A-rank abnormality is an abnormality whose influence on operation of the automatic braking is smaller than that of the S-rank abnormality, and a B-rank abnormality is an abnormality whose influence on operation of the automatic braking is smaller than that of the A-rank abnormality.

Then, the brake control device 7 stops operation of the automatic braking by controlling the vehicle stabilizing device 5 in accordance with the influence of the detected abnormality on operation of the automatic braking.

Specifically, in a case where an S-rank abnormality of the vehicle 10 has been detected, the brake control device 7 controls the vehicle stabilizing device 5 to promptly stop operation of the automatic braking.

In a case where an A-rank abnormality of the vehicle 10 has been detected, the brake control device 7 controls the vehicle stabilizing device 5 to stop operation of the automatic braking after elapse of the minimum operation period from activation of the automatic braking.

In a case where a B-rank abnormality of the vehicle 10 has been detected, the brake control device 7 controls the vehicle stabilizing device 5 to gradually decrease braking force generated by operation of the automatic braking and to stop operation of the automatic braking at a point in time at which the braking force becomes zero.

According to the configuration, since the vehicle stabilizing device 5 is controlled to stop operation of the automatic braking in accordance with the influence of a detected abnormality on the automatic braking, driver's operation intention can be effectively reflected in the vehicle 10. For example, since operation of the automatic braking is promptly stopped in a case where an abnormality occurs in the vehicle stabilizing device 5 (S-rank abnormality), braking force according to driver's braking intention is generated in the vehicle 10 in a case where the driver presses the brake pedal 2. Even in a case where sufficient braking force is not generated by the automatic braking due to an abnormality of the vehicle stabilizing device 5, sufficient braking force desired by the driver is generated in the vehicle 10 by a driver's operation of pressing the brake pedal 2. In this way, the driver's intention (decelerating intention) is effectively reflected in behavior of the vehicle 10.

Furthermore, in a case where the brake control device 7 cannot acquire the vehicle body speed of the vehicle 10 (A-rank abnormality), operation of the automatic braking is stopped after elapse of the minimum operation period from activation of the automatic braking. This avoids a situation in which braking force is generated by the automatic braking in the vehicle 10 whose vehicle body speed is zero (the vehicle 10 that is parked). Therefore, in a case where the driver presses the accelerator pedal 30 with the intention (accelerating intention), the vehicle 10 can be accelerated in accordance with the driver's accelerating intention. In this way, the driver's intention (accelerating intention) is effectively reflected in the behavior of the vehicle 10.

Furthermore, in a case where the brake control device 7 cannot acquire brake stroke and/or accelerator stroke (B-rank abnormality), the braking force of the automatic braking is gradually decreased, and operation of the automatic braking is stopped at a point in time at which the braking force becomes zero. Therefore, even in a case where the brake control device 7 cannot determine the state of the brake pedal 2 and/or the accelerator pedal 30 (whether or not a pressing operation is performed), suitable braking force is generated in the vehicle 10 by the automatic braking, and driver's intention (accelerating intention or braking intention) can be effectively reflected in behavior of the vehicle 10.

Note that the present disclosure can be modified as appropriate within the scope of the disclosure.

For example, in the present embodiment, an abnormality in the vehicle stabilizing device 5 is an S-rank abnormality, a state where the brake control device 7 is unable to acquire vehicle body speed is an A-rank abnormality, and a state where the brake control device 7 is unable to acquire brake stroke and/or accelerator stroke is a B-rank abnormality.

However, the abnormalities of the respective ranks are not limited to these abnormalities. The abnormalities of the respective ranks can be, for example, set as appropriate in accordance with driving performance, braking performance, and the like requested of the vehicle 10.

In the present embodiment, in a case where an S-rank abnormality has been detected during operation of the automatic braking, the brake control device 7 promptly stops operation of the automatic braking; in a case where an A-rank abnormality has been detected during operation of the automatic braking, the brake control device 7 stops operation of the automatic braking after elapse of the minimum operation period from activation of the automatic braking; and in a case where a B-rank abnormality has been detected during operation of the automatic braking, the brake control device 7 gradually decreases braking force of the automatic braking.

However, the states of the automatic braking after occurrence of abnormalities of the respective ranks are not limited to these states. The states of the automatic braking after occurrence of abnormalities of the respective ranks can be changed as appropriate in accordance with the contents of the abnormalities of the respective ranks.

For example, in a case where an abnormality of failure of the brake control device 7 to acquire brake stroke and/or accelerator stroke is set as a B-rank abnormality, the brake control device 7 may gradually decrease the caliper pressure (braking force) upon detection of a B-rank abnormality.

What is claimed is:

1. A braking device for vehicle, comprising:
   a first oil pressure generating unit that generates an oil pressure in an operating oil in accordance with an amount of operation of a brake operating unit;
   a second oil pressure generating unit that generates the oil pressure in the operating oil in accordance with an oil pressure generation command supplied from a brake control device; and
   a braking unit that is put into operation by the oil pressure generated in the operating oil in the first oil pressure generating unit or the oil pressure generated in the operating oil in the second oil pressure generating unit so as to generate braking force for braking a wheel of a vehicle,
   the brake control device putting automatic braking into operation by controlling the second oil pressure generating unit to generate the oil pressure when an impact is detected by a predetermined sensor provided in the vehicle, and
   in a case where an abnormality of the vehicle has been detected during operation of the automatic braking, the brake control device controlling the second oil pressure generating unit to stop operation of the automatic braking in accordance with influence of the abnormality on operation of the automatic braking.

2. The braking device for vehicle according to claim 1, wherein
   in a case where the abnormality is an abnormality of a failure to acquire vehicle body speed of the vehicle, the brake control device stops operation of the automatic braking after elapse of a predetermined period from activation of the automatic braking.

3. The braking device for vehicle according to claim 1, wherein
   in a case where the abnormality is an abnormality of a failure to acquire at least one of (i) an amount of operation of an accelerator operating unit that is operated to accelerate the vehicle and (ii) the amount of operation of the brake operating unit, the brake control device gradually decreases the braking force that is generated in the braking unit due to operation of the automatic braking, and stops operation of the automatic braking at a point in time at which the braking force becomes zero.

4. The braking device for vehicle according to claim 1, wherein
   in a case where the abnormality is an abnormality of a failure of the second oil pressure generating unit to generate the oil pressure, the brake control device stops operation of the automatic braking at a time of detection of the abnormality.

* * * * *